T. A. HOBBS.
BELT GUIDE.
APPLICATION FILED FEB. 6, 1913.
1,068,242.
Patented July 22, 1913.
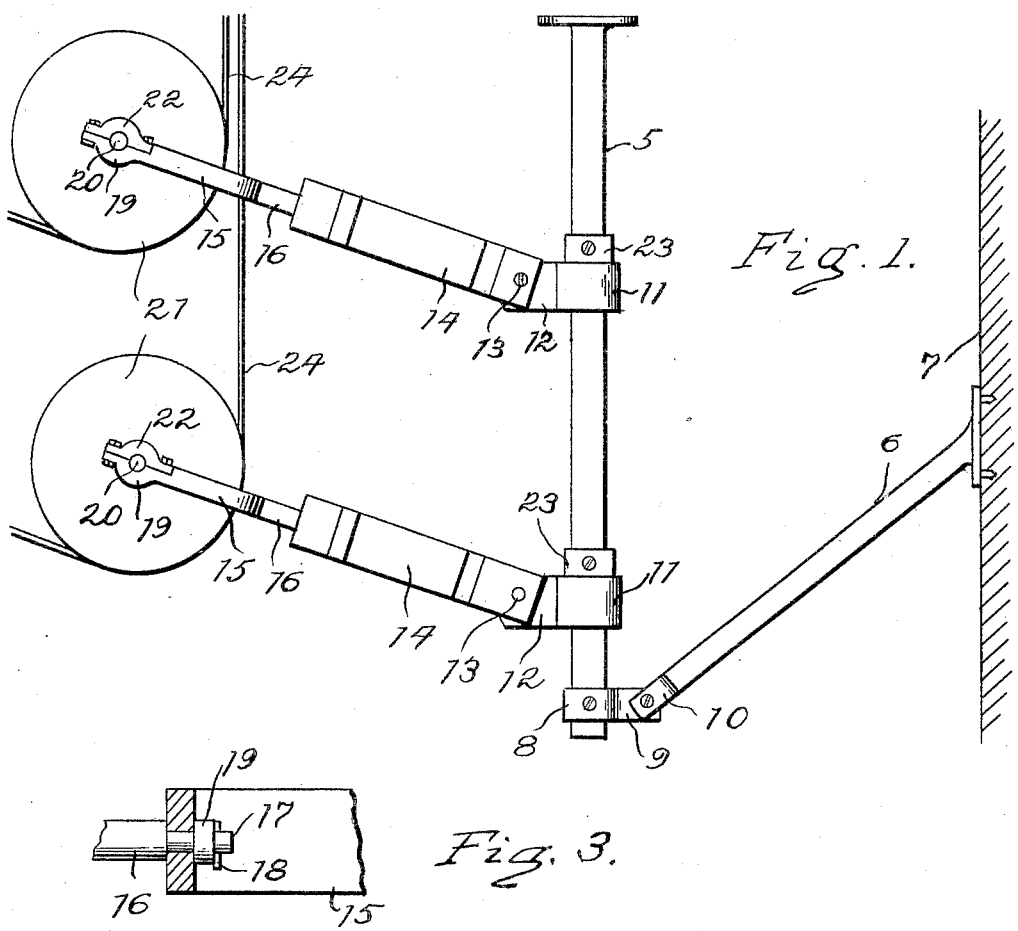
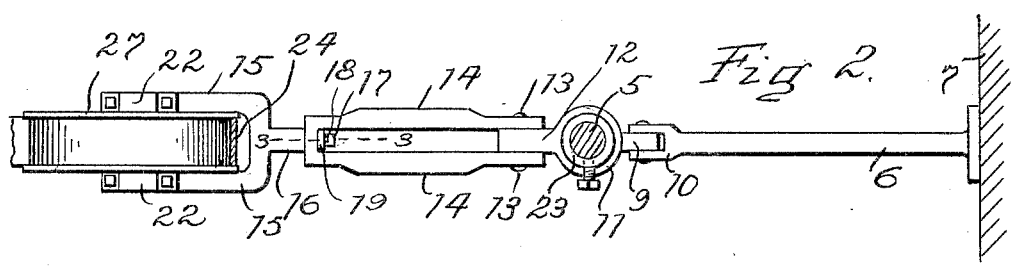
Witnesses
Francis Mae Nerhany.
Rodney M. Smith.
Inventor
Theodore A. Hobbs.
By
Attorney

UNITED STATES PATENT OFFICE.

THEODORE A. HOBBS, OF UTICA, NEW YORK.

BELT-GUIDE.

1,068,242.　　　　　　　　Specification of Letters Patent.　　Patented July 22, 1913.

Application filed February 6, 1913.　Serial No. 746,537.

*To all whom it may concern:*

Be it known that I, THEODORE A. HOBBS, a citizen of the United States, residing at Utica, in the county of Oneida and State of New York, have invented certain new and useful Improvements in Belt-Guides, of which the following is a specification.

This invention comprehends improvements in belt guides and relates more particularly to devices of this nature for use in connection with angle drives.

The primary object of the invention resides in the provision of a belt guide, which shall be of extremely simple construction, cheap to manufacture, durable, and very reliable.

Another and more specific object of the invention is to provide a belt guide for use in connection with angle drives and comprising a sleeve member slidable upon a standard, a U-shaped frame pivoted to said sleeve member, a forked member swiveled to said frame, and a pulley journaled in said forked member.

The invention also aims to generally improve devices of this nature to render them more satisfactory and commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a side elevation of my invention, showing the same in use, Fig. 2 is a top plan view, the supporting standard being shown in section, and, Fig. 3 is a section taken upon the plane of line 3—3 of Fig. 2.

Referring in detail to the drawing by numerals 5 designates a cylindrical standard depending from a suitable supporting surface, and 6 designates a brace secured at one end to the support 7, and at its other end to a set collar 8, said collar being provided with an apertured ear 9, which projects between the bifurcated end 10 of said brace. A sleeve 11 is slidable and rotatable upon the standard 5 and is formed with an integral apertured ear or projection 12, to which is pivotally secured, by means of a suitable fastener 13, a U-shaped frame 14. A forked member having the arms 15 and shank 16, is swiveled in the end of said frame. As clearly shown in Fig. 3, the shank 16 is reduced at its inner end, as at 17, projects through a circular opening in the frame 14, and is secured therein by a pin 18, which extends through said reduced end portion. If desired, a washer or collar 19, may be interposed between the pin 18 and the frame. The free ends of the arms 15 are enlarged, as at 19, and recessed to provide bearings for a shaft 20, upon which a pulley 21 is journaled. Cap plates 22 are suitably secured to the enlarged portions 19, of the arms 15 and hold said shaft within the bearings.

A set collar 23 is adjusted upon the standard 5 and limits the movement of the sleeve 11 in one direction. It will be noted upon reference to Fig. 1, that the belt 24, which runs over the pulley 21, may be easily tightened by a suitable adjustment of the set collar 23, and that said belt serves to normally hold the sleeve 11 against the set collar. The pulley 21 is capable of movement in a vertical plane, a horizontal plane, and may also rotate with its support, and is therefore able to accommodate itself to slight changes in the alinement of the drive and driven pulleys.

My improved guide also acts in the capacity of a belt tightener, for should the belt become loose, the device will slide downwardly upon the standard 5 under the action of gravity and so tighten the belt. When two of my improved guides are used, as shown in the drawing, one of the belts 24 may be run between the arms 15 of both of the guides.

It will be seen from the foregoing description in connection with the accompanying drawing, that I have provided a belt guide for angle drives, in which the idler pulley may adjust itself to the alinement of the drive and driven pulleys and may also adjust itself to the pitch of the belt. It will also be seen that my improved guide may be easily positioned and very easily adjusted upon the standard and that it will also act as a tightener.

It is to be understood that while I have shown and described the preferred embodiment of my invention, I do not wish to be limited to this exact construction, combination, and arrangement of parts, but may make such changes as will fall within the spirit and scope of the invention.

Having thus described my invention, what I claim is:—

1. The combination with a standard, of a sleeve slidable and rotatable thereon, a U-shaped frame pivoted to said sleeve, a forked member swiveled in said frame, and a pulley journaled between the forks of said member.

2. The combination with a standard, of a sleeve member slidable and rotatable thereon, said sleeve member being formed with an apertured ear, a U-shaped frame pivoted at its free ends to said ear, a forked member swiveled to the free end of said frame, a pulley journaled between the forks of said member, and means secured to said standard for limiting the longitudinal movement of the sleeve in one direction.

3. The combination with a standard, of a belt guide comprising a sleeve slidable upon said standard and formed with an apertured ear, a U-shaped frame pivoted at one end to said ear, a forked member having a reduced shank portion swiveled in the free end of said frame, a pulley journaled between the forks of said member, and set collars adjustable upon said standard.

In testimony whereof I affix my signature in presence of two witnesses.

THEODORE A. HOBBS.

Witnesses:
CHAUNCEY B. WEIR,
THOS. BARLOW.

---

Copies of this patent may be obtained for five cents each, by addressing the "Commissioner of Patents, Washington, D. C."